United States Patent
Lee (10) Patent No.: US 8,908,318 B2
(45) Date of Patent: Dec. 9, 2014

(54) HARD DISK DRIVE AND METHOD FOR MANUFACTURING A BASE PLATE WHICH INCLUDES A COMPONENT RECEIVING PART

(71) Applicant: Samsung Electro-Mechanics Co., Ltd., Suwon (KR)

(72) Inventor: Hyun Chul Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 14 days.

(21) Appl. No.: 13/721,483

(22) Filed: Dec. 20, 2012

(65) Prior Publication Data

US 2014/0085747 A1    Mar. 27, 2014

(30) Foreign Application Priority Data

Sep. 25, 2012    (KR) .................. 10-2012-0106662

(51) Int. Cl.
| | |
|---|---|
| G11B 33/02 | (2006.01) |
| G11B 33/12 | (2006.01) |
| G11B 5/127 | (2006.01) |
| G11B 5/54 | (2006.01) |
| G11B 33/00 | (2006.01) |
| G11B 33/14 | (2006.01) |
| G11B 25/04 | (2006.01) |

(52) U.S. Cl.
CPC .............. *G11B 5/54* (2013.01); *G11B 5/1272* (2013.01); *G11B 33/00* (2013.01); *G11B 33/1466* (2013.01); *G11B 25/043* (2013.01)
USPC ........................................ 360/97.11; 360/97.12

(58) Field of Classification Search
USPC .......................................... 360/97.11, 97.12
See application file for complete search history.

(56) References Cited

U.S. PATENT DOCUMENTS

| | | | | |
|---|---|---|---|---|
| 5,541,787 | A  * | 7/1996  | Jabbari et al. | 360/99.16 |
| 6,566,776 | B2 * | 5/2003  | Hoffmann et al. | 310/91 |
| 6,934,126 | B1 * | 8/2005  | Berding et al. | 360/264.2 |
| 7,624,611 | B2 * | 12/2009 | Saitou | 72/349 |
| 8,059,364 | B1 * | 11/2011 | Andrikowich et al. | 360/99.22 |
| 8,098,454 | B2 * | 1/2012  | Kouno et al. | 360/99.21 |
| 8,179,631 | B2 * | 5/2012  | Aoyagi et al. | 360/97.11 |
| 2004/0184184 | A1 | 9/2004 | Komatsu et al. | |
| 2005/0068666 | A1 * | 3/2005 | Albrecht et al. | 360/97.02 |
| 2007/0263319 | A1 * | 11/2007 | Calderon et al. | 360/97.02 |
| 2009/0097163 | A1 * | 4/2009 | Suzuki et al. | 360/245.8 |
| 2010/0232064 | A1 | 9/2010 | Lim et al. | |
| 2010/0308695 | A1 * | 12/2010 | Numata et al. | 310/344 |

FOREIGN PATENT DOCUMENTS

| | | |
|---|---|---|
| JP | 2004-234731 | 8/2004 |
| KR | 10-2010-0103922 | 9/2010 |

* cited by examiner

*Primary Examiner* — Jefferson Evans (57) ABSTRACT

There is provided a base plate including: a base body; and a component receiving part penetrating through the base body so as to receive a circuit component mounted on a substrate therein at the time of coupling the substrate and the base body, wherein the component receiving part includes a step part formed in an outer edge thereof so that a sealing member is seated on the step part to seal the component receiving part.

11 Claims, 8 Drawing Sheets

HARD DISK DRIVE AND METHOD FOR MANUFACTURING A BASE PLATE WHICH INCLUDES A COMPONENT RECEIVING PART

CROSS-REFERENCE TO RELATED APPLICATIONS

This application claims the priority of Korean Patent Application No. 10-2012-0106662 filed on Sep. 25, 2012, in the Korean Intellectual Property Office, the disclosure of which is incorporated herein by reference.

BACKGROUND OF THE INVENTION

1. Field of the Invention

The present invention relates to a base plate for a hard disk drive and a hard disk drive including the same, and more particularly, to a base plate for a hard disk drive including a component receiving part capable of receiving circuit components mounted on a substrate therein, a method for manufacturing the same, and a hard disk drive including the same.

2. Description of the Related Art

A hard disk drive (HDD), a computer information storage device, reads data stored on a disk or writes data to a disk using a magnetic head.

In a hard disk drive, a base plate is installed with a head driver, that is, a head stack assembly (HSA), capable of moving the magnetic head across the face of the disk. The magnetic head performs its function while moving to a desired position in a state in which it is suspended above a writing surface of the disk by the head driver at a predetermined height.

According to the related art, in manufacturing a base plate provided in the hard disk drive, a post-processing scheme of die-casting aluminum (Al) and then removing burrs, or the like, generated due to the die-casting, has been used.

However, in the die-casting scheme according to the related art, since a process of injecting molten aluminum (Al) for die-casting to form a base plate is performed, high levels of temperature and pressure are required, such that a high amount of energy is required in the process and a process time is increased.

Further, in terms of a lifespan of a die-casting mold, there is a limitation in manufacturing a large number of base plates using a single mold, and a base plate manufactured by the die-casting process may have poor dimensional precision.

Therefore, the base plate has been manufactured by a pressing or forging process in order to solve problems inherent in the die-casting process. Accordingly, research into a technology of securing a space in which circuit components mounted on a substrate may be received and preventing a problem in rigidity, despite using a steel-based sheet provided to be as thin as possible at the time of a pressing or forging process, in accordance with the requirements for miniaturization and thinness of a hard disk drive, has been urgently demanded.

In the following Patent Document 1, a problem in that it is difficult to decrease the overall height of a hard disk drive due to circuit components mounted on a printed circuit board is present.

RELATED ART DOCUMENT (Patent Document 1) Korean Patent Laid-Open Publication No. 2010-0103922

SUMMARY OF THE INVENTION

An aspect of the present invention provides a base plate for a hard disk drive capable of being manufactured by plastically deforming a steel sheet and satisfying requirements for miniaturization and thinness by including a component receiving part capable of receiving circuit components mounted on a substrate therein, a method for manufacturing the same, and a hard disk drive including the same.

Another aspect of the present invention provides a base plate capable of maintaining rigidity despite including a space capable of receiving circuit components mounted on a substrate therein, and a hard disk drive including the same.

Another aspect of the present invention provides a hard disk drive capable of preventing external foreign objects from being introduced into an inner portion thereof.

Another aspect of the present invention provides a base plate capable of significantly decreasing a process time and energy consumption by being manufactured in a pressing or forging process, a method for manufacturing the same, and a hard disk drive including the same.

According to an aspect of the present invention, there is provided a base plate including: a base body; and a component receiving part penetrating through the base body so as to receive a circuit component mounted on a substrate therein at the time of coupling the substrate and the base body, wherein the component receiving part includes a step part formed in an outer edge thereof so that a sealing member is seated on the step part to seal the component receiving part.

The base body may be formed by plastically deforming a steel plate.

A thickness of the step part may be less than that of the base body.

The base plate may satisfy the following Equation 7:

$$0 < S'^2 < 0.5625 \qquad \text{Equation 7,}$$

where $S'^2$ indicates a ratio of an area of the component receiving part to an area of the step part.

A diameter of the component receiving part may be larger than 0% of a diameter of the step part and may be equal to or smaller than 50% of the diameter of the step part.

According to another aspect of the present invention, there is provided a method for manufacturing a base plate, the method including: forming a preparation hole in a base body by penetrating through the base body in a predetermined position thereof; fixing the base body to a jig; pressing an outer edge of the preparation hole of the base body to form a step part in the base body; and forming a component receiving part in the base body by pressing the base body so as to decrease a diameter of the preparation hole.

The base plate may satisfy the following Equation 7:

$$0 < S'^2 < 0.5625 \qquad \text{Equation 7,}$$

where $S'^2$ indicates a ratio of an area of the component receiving part to an area of the step part.

The base plate may satisfy the following Equation 9:

$$0.16 < S^2 < 0.81 \qquad \text{Equation 9,}$$

where $S^2$ indicates a ratio of an area of the preparation hole to an area of the step part.

The base plate may satisfy the following Equation 5:

$$w^2 = 1 - (1 - w'^2)\frac{t'}{t}, \qquad \text{Equation 5}$$

where w indicates a ratio of a diameter of the preparation hole to a diameter of the step part, w' indicates a ratio of a diameter of the component receiving part to the diameter of the step part, t indicates a thickness of the base body, and t' indicates a thickness of the step part.

The base plate may satisfy the following Equation 6:

$$0 < w' < 0.75 \quad \text{Equation 6,}$$

where w' indicates a ratio of the diameter of the component receiving part to the diameter of the step part.

The base plate may satisfy the following Equation 8:

$$0.4 < w < 0.9 \quad \text{Equation 8,}$$

where w indicates a ratio of the diameter of the preparation hole to the diameter of the step part.

According to another aspect of the present invention, there is provided a hard disk drive including: the base plate as described above; a spindle motor coupled to the base plate to rotate a disk; a magnetic head writing data to and reading data from the disk; and a head driver moving the magnetic head to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 1:
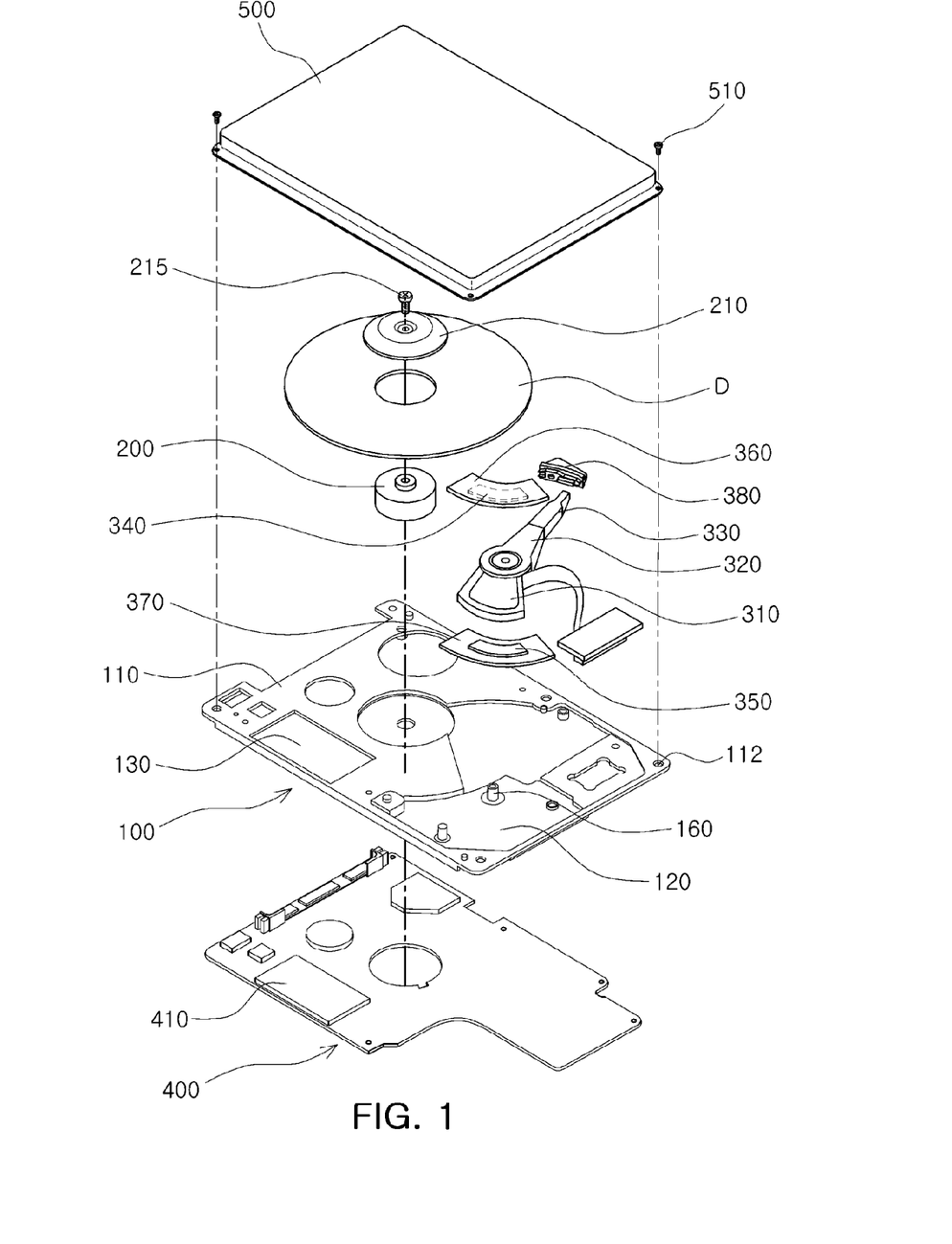
FIG. 1 is a schematic exploded perspective view showing a hard disk drive according to an embodiment of the present invention.

FIG. 1 is a schematic exploded perspective view showing a hard disk drive according to an embodiment of the present invention.

Referring to FIG. 1, the hard disk drive according to the embodiment of the present invention may include a base plate 100 for a hard disk drive (hereinafter, referred to as the base plate), a spindle motor 200, a head driver 300, and a substrate 400.

The base plate 100 may be a housing forming an appearance together with a cover plate 500 in the hard disk drive according to the embodiment of the present invention and include a base body 110 and a head seating part 120.

Here, the base plate 100 and the cover plate 500 may be coupled to each other by coupling a plurality of screws 510 to holes 112 formed in the base plate 100.

Here, the base body 110 may be formed by plastically deforming a steel plate. More specifically, after a basic shape of the base body 110 is manufactured by press processing, a final shape thereof may be manufactured by additional processing such as bending or cutting.

That is, the base body 110 according to the embodiment of the present invention may be manufactured by performing a single process by plastic working such as press processing, or the like, or an additional process on a cold rolled steel sheet (SPCC, SPCE, or the like), a hot rolled steel sheet, a stainless steel, or a lightweight alloy steel sheet such as a boron or a magnesium alloy sheet, unlike the post-processing scheme according to the related art in which aluminum (Al) is die-cast and burrs and the like, generated due to the die-casting are then removed.

Therefore, since the base body 110 according to the embodiment of the present invention may be manufactured by the press processing, a process time and energy consumption are significantly decreased, whereby production capability may be improved.

Here, the base body 110 may be provided with at least one component receiving part 130 penetrating through upper and lower surfaces thereof.

The component receiving part 130 may provide a space in which circuit components 410 mounted on the substrate 400 may be received.

The component receiving part 130 may be described in detail with reference to FIGS. 2 through 6.

The base body 110, a part on which a disk D coupled to the spindle motor 200 to be described below is disposed, may have the disk D positioned thereon, the disk D having data stored thereon.

The base body 110 may be formed in a generally circular shape so as to correspond to a shape of the disk D, and a portion of the base body 110 may be stepped to configure the head seating part 120 on which the head driver 300 to be described below is disposed.

Here, the head seating part 120 is positioned in a position lower than that of the base body 110 to provide a space in which the head driver 300 is repeatedly rotated so as to read data from and write data to the disk D.

That is, the reason why the head seating part 120 is positioned in the position lower than that of the base body 110 is to secure a space in which the head driver 300 provides driving force to a magnetic head (not shown) to insert the magnetic head (not shown) into the disk D, thereby reading data from and writing data to the disk D.

The spindle motor 200, provided to rotate the disk D, may be fixedly mounted in the center of the base body 110. The disk D, coupled to the spindle motor 200 to rotate together therewith, may have a writing surface on which data is written.

Here, the spindle motor 200 may includes a clamp 210 coupled to an upper end portion thereof by a screw 215 in order to firmly fix the disk D thereto.

Figure 2:
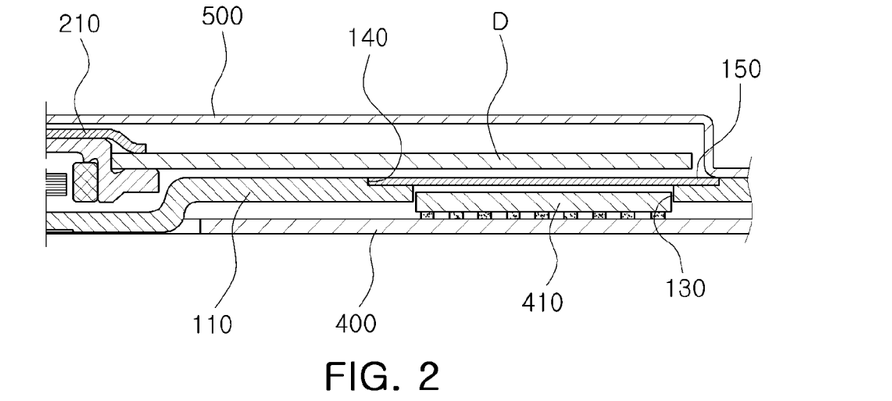
FIG. 2 is a cross-sectional view of a half of the hard disk drive according to the embodiment of the present invention.

In addition, although FIGS. 1 and 2 show a configuration in which a single disk D is mounted on the spindle motor 200, this configuration is only an example. That is, one or more disks D may be mounted on the spindle motor 200. In the case in which a plurality of disks D are mounted as described above, a ring shaped spacer for maintaining an interval between the disks D may be disposed between the disks D.

The head driver 300 may be called a head stack assembly (HAS) and be a component having a magnetic head (not shown) mounted thereon and moving the magnetic head to a predetermined position to write data to the disk D or read data written on the disk D.

The head driver 300 may include a voice coil motor (VCM), a swing arm 320, and a suspension 330, wherein the suspension 330 may be fixedly coupled to a front end portion of the swing arm 320.

In addition, the head driver 300 may be coupled to the base plate 100 so as to be rotatable around a pivot shaft 160 of the head seating part 120 of the base plate 100. When the disk D rotates on the base body 110 of the base plate 100 at a high speed, the magnetic head (not shown) may serve to read the data written on the writing surface of the disk D or write the data to the writing surface of the disk D.

Here, the VCM, providing rotational driving force to the head driver 300, may include magnets 340 and 350 disposed on upper and lower portions of a VCM coil 310 of the head driver 300.

The VCM may be controlled by a servo control system and rotate the head driver 300 around the pivot shaft 160 in a direction according to Fleming's left hand rule by interaction between current input by the VCM coil 310 and a magnetic field formed by the magnets 340 and 350.

Here, the magnets 340 and 350 disposed on the upper and lower portions of the coil 310 provided in the VCM may be coupled to upper and lower yokes 360 and 370, respectively, in order to increase magnetic flux density and be fixed to the base body 110.

Here, when an operation start command is input to the hard disk drive according to the embodiment of the present invention, the disk D starts to rotate, and the VCM rotates the swing arm 320 in a counterclockwise direction to move the magnetic head (not shown) onto the writing surface of the disk D.

On the other hand, when an operation stop command is input to the hard disk drive according to the embodiment of the present invention, the VCM rotates the swing arm 320 in a clockwise direction to allow the magnetic head (not shown) to deviate from the disk D.

The magnetic head (not shown) deviating from the writing surface of the disk D is parked in a ramp 380 provided outside the disk D.

Figure 3:
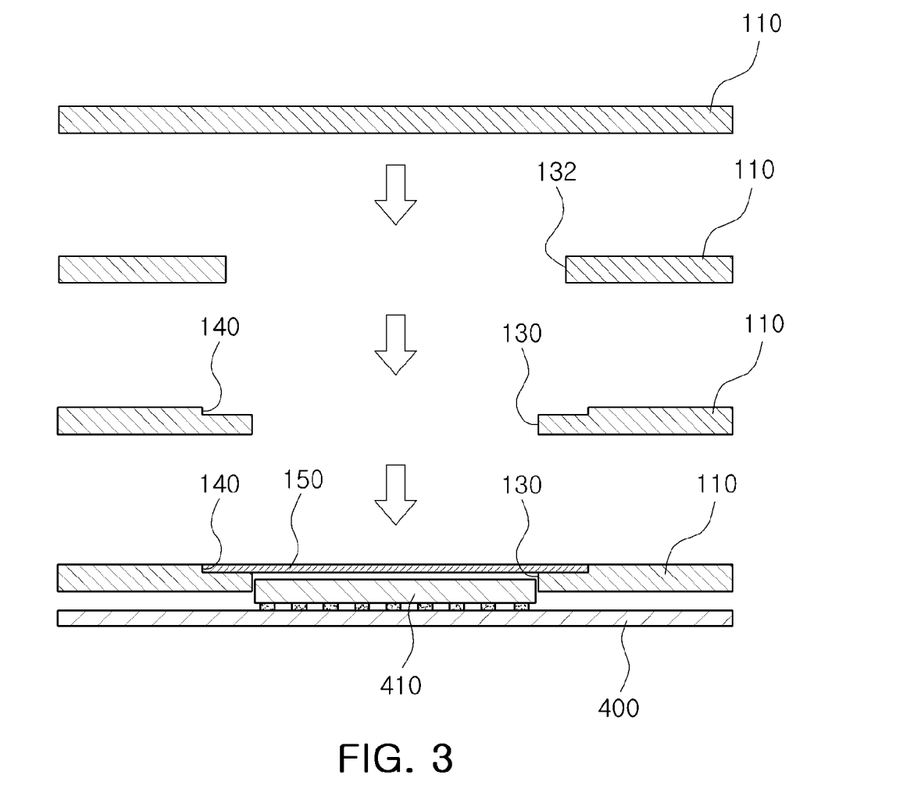
FIG. 3 is a schematic cross-sectional view showing a process of forming a component receiving part in a base body according to the embodiment of the present invention.
Figure 4:
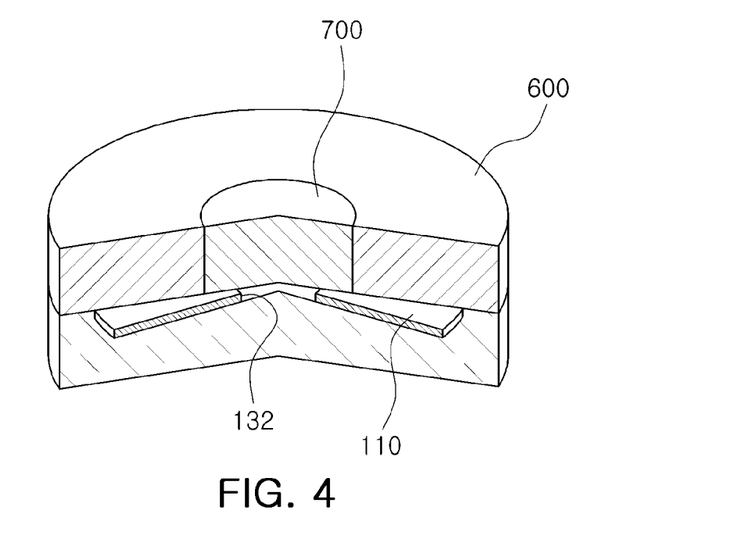
FIG. 4 is a perspective view showing a form in which a base body is fixed to a jig in order to form a step part in the base body according to the embodiment of the present invention.
Figure 5:
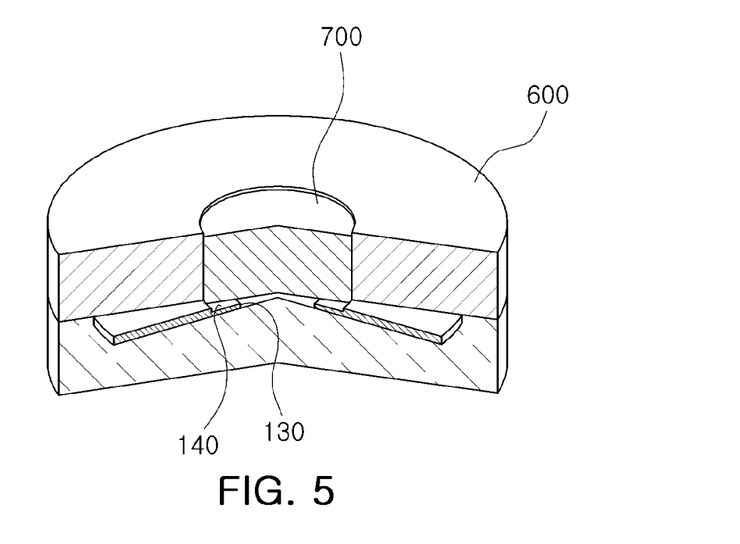
FIG. 5 is a perspective view showing a form in which the step part is formed in the base body using a punch according to the embodiment of the present invention.
Figure 6A:
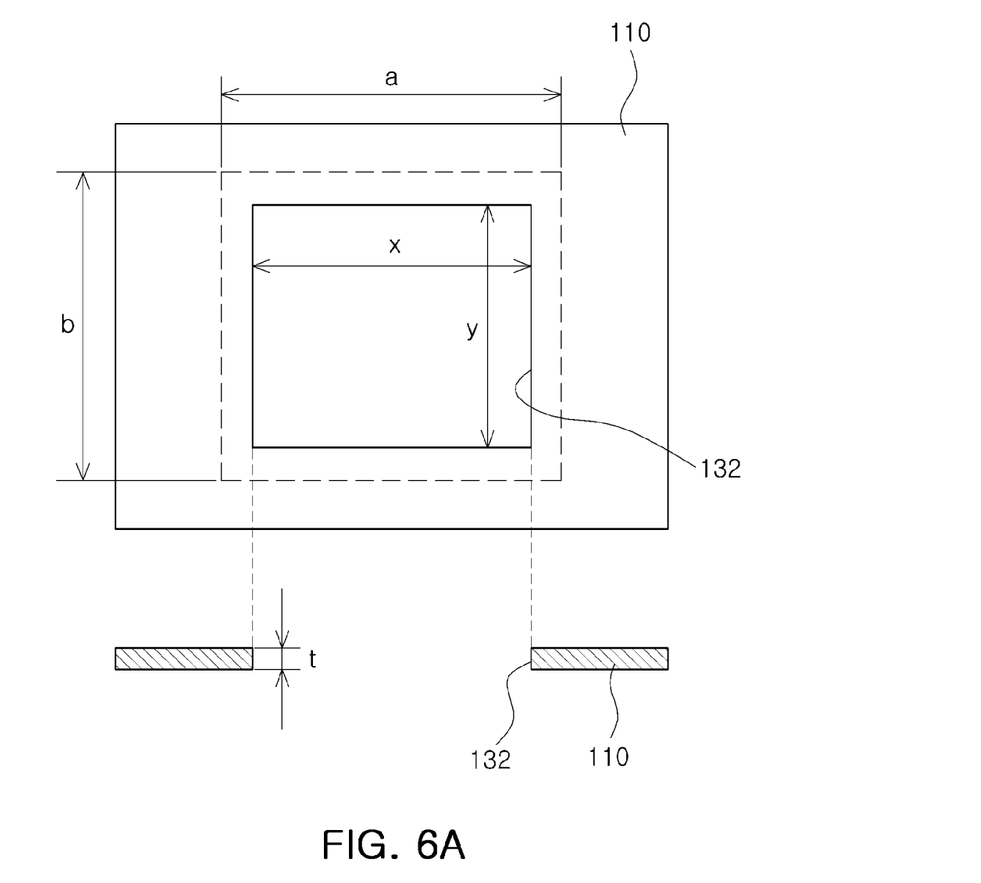
FIG. 6A is a schematic plan view showing a form in which a preparation hole is formed in the base body according to the embodiment of the present invention.
Figure 6B:
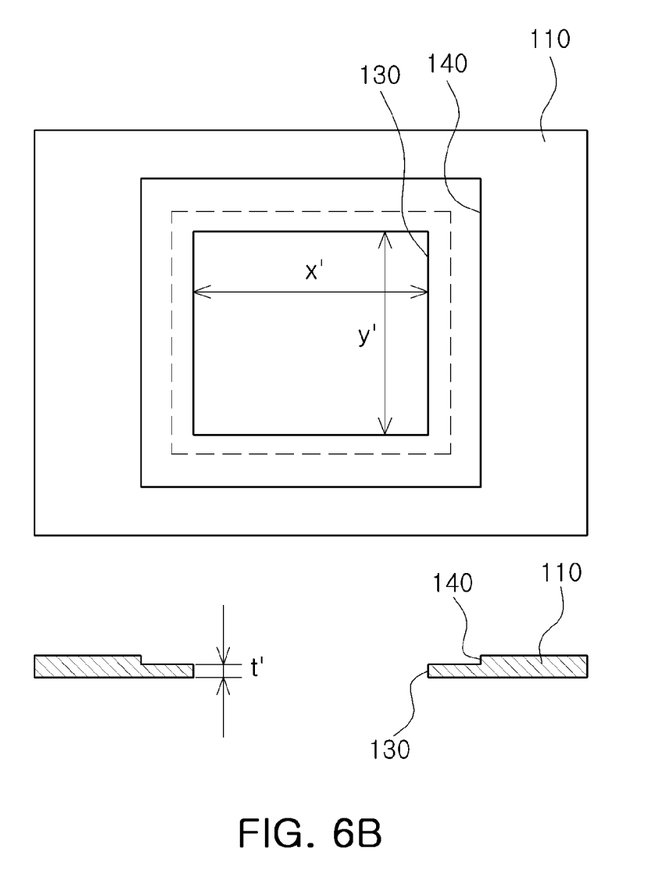
FIG. 6B is a schematic plan view showing a form in which the component receiving part and the step part are formed in the base body according to the embodiment of the present invention.

FIG. 2 is a cross-sectional view of a half of the hard disk drive according to the embodiment of the present invention; FIG. 3 is a schematic cross-sectional view showing a process of forming a component receiving part in a base body according to the embodiment of the present invention; FIG. 4 is a perspective view showing a form in which a base body is fixed to a jig in order to form a step part in the base body according to the embodiment of the present invention; FIG. 5 is a perspective view showing a form in which the step part is formed in the base body using a punch according to the embodiment of the present invention; FIG. 6A is a schematic plan view showing a form in which a preparation hole is formed in the base body according to the embodiment of the present invention; and FIG. 6B is a schematic plan view showing a form in which the component receiving part and the step part are formed in the base body according to the embodiment of the present invention.

Referring to FIGS. 2 through 6B, the base body 110 according to the embodiment of the present invention may be provided with the component receiving part 130 and a step part 140.

The base body 110 may have the substrate 400 mounted on a lower portion thereof in order to supply power to a coil of the spindle motor 200, wherein the substrate 400 may be a flexible printed circuit board.

The substrate 400 may be mounted with the plurality of circuit components 410, and the base body 110 may be provided with the component receiving part 130 capable of receiving the circuit components 410 mounted on the substrate 400.

Therefore, the component receiving part may be larger than that of the circuit component 410.

The component receiving part 130 may be provided to penetrate through the upper and lower surfaces of the base body 110 and be formed as a hole.

Here, the component receiving part 130 may be rectangular, square, circular, or oval, and may also have various shapes according to a shape of the circuit component 410 mounted on the substrate 400.

The component receiving part 130 may be formed in a predetermined position of the base body 100 so as to correspond to a position of the circuit component 410 mounted on the substrate 400 when the substrate 400 is mounted under the base body 110, and the circuit component 410 may be received in the component receiving part 130.

In addition, the circuit component 410 may be received in the component receiving part 130 so as not to protrude upwardly from the base body 100.

This is intended to form a space in which a sealing member 150 to be described below may be seated.

The step part 140 may be formed outwardly of the component receiving part 130 in an upper surface of the base body 110.

The step part 140 may be stepped from the upper surface of the base body 110 downwardly in an axial direction. The sealing member 150 may be seated on the step part 140 to seal the component receiving part 130.

Since the component receiving part 130 needs to be sealed in order to prevent foreign objects, or the like, from being introduced into the hard disk drive according to the embodiment of the present invention and maintain rigidity of the base body 110, the component receiving part 130 may be sealed by the sealing member 150.

That is, the sealing member 150 may be seated on the step part 140 formed in the base body 110 and seal the component receiving part 130.

Here, as the sealing member 150, a member such as a tape, or the like, may be used.

Hereinafter, a method for manufacturing the base body 110 according to the embodiment of the present invention will be described with reference to FIG. 3.

The configuration of the base body 110 described above may also become clear from the following description of the method for manufacturing the base body 110.

First, the base body 110 according to the embodiment of the present invention is manufactured by performing plastic working such as press processing, or the like, on a cold rolled steel sheet (SPCC, SPCE, or the like), a hot rolled steel sheet, stainless steel, or a lightweight alloy steel sheet such as a boron or a magnesium alloy sheet.

After a basic shape of the base body 110 is manufactured by press processing, a preparation hole 132 is formed in a position corresponding to that of the circuit component 410 mounted on the substrate 400.

Here, the preparation hole 132 refers to an initial hole provided in the base body 110, and the component receiving part 130 refers to a component formed by pressing a predetermined position of the base body 110 to decrease a size of the preparation hole 132.

A jig 600 is fixed to the base body 110 including the preparation hole 132 and the base body 110 corresponding to an outer edge of the preparation hole 132 is pressed using a punch 700, or the like, to form the step part 140 in the base body 110.

In the case in which the base body 110 is pressed, since a thickness of the base body 110 is changed, a size of the preparation hole 132 may be decreased. Here, the preparation hole 132 decreased to a desired size may become the component receiving part 130.

This will be described below in detail with reference to FIGS. 6A and 6B.

The sealing member 150 may be seated on the step part 140, prevent external foreign objects from being introduced, and maintain the rigidity of the base body 110.

Referring to FIG. 6A, the preparation hole 132 penetrating through the upper and lower surfaces of the base body 110 according to the embodiment of the present invention may have a rectangular shape, and it may be assumed that a length and a width of the preparation hole 132 are x and y, respectively.

Here, in order for the base body 110 to include the step part 140, the outer edge of the preparation hole 132 may be pressed, and it may be assumed that a length and a width of the step part 140 are a and b, respectively.

In addition, it may be assumed that a thickness of the base body 110 is t.

When the outer edge of the preparation hole 132 of the base body 110 according to the embodiment of the present invention is pressed, the base body 110 is deformed to thereby decrease the size of the preparation hole 132, the component receiving part 130 may be formed accordingly.

More specifically, in the case of pressing the base body 110 to form the step part 140, since the base body 110 is deformed by a thickness decreased at a portion thereof at which the step part 140 is formed, the size of the preparation hole 132 may be decreased as compared with an initial size thereof.

That is, since the component receiving part 130 capable of receiving the circuit component 410 therein is formed by decreasing the size of the preparation hole 132, it is preferable that the component receiving part 130 is formed to have a size corresponding to that of the circuit component 410 mounted on the substrate 400, and the preparation hole 132 needs to be formed to have a sufficiently large size.

Since the component receiving part 130 is formed by decreasing the size of the preparation hole 132, it is consequentially important to determine at what size the preparation hole 132 is initially formed to be.

Referring to FIG. 6B, it may be assumed that a length and a width of the component receiving part 130 formed by decreasing the size of the preparation hole 132 are x' and y', respectively, and a thickness of the step part 140 is t'.

Here, before or after the step part 140 is formed by pressing the base body 110, the overall volume of the base body 110 is not changed, which may be represented by the following Equation 1.

$$(a \times b - x \times y) \times t = (a \times b - x' \times y') \times t'$$ [Equation 1]

In addition, when Equation 1 is arranged, it may be represented by the following Equation 2.

$$\frac{x \times y}{a \times b} = 1 - \left(1 - \frac{x' \times y'}{a \times b}\right) \times \frac{t'}{t}$$ [Equation 2]

Here, when the length x and the width y of the preparation hole 132 are constantly changed by applying constant force to the base body 110, it may be represented by the following Equation 3 and Equation 4.

$$\frac{x}{a} = \frac{y}{b} = w$$ [Equation 3]

The above Equation 2 indicates a ratio of the length x of the preparation hole 132 to the length a of the step part 140 and a ratio of the width y of the preparation hole 132 to the width b of the step part 140.

$$\frac{x'}{a} = \frac{y'}{b} = w'$$ [Equation 4]

The above Equation 4 indicates a ratio of the length x' of the component receiving part 130 to the length a of the step part 140 and a ratio of the width y' of the component receiving part 130 to the width b of the step part 140.

When the above Equation 3 and Equation 4 are substituted for the above Equation 2, it may be represented by the following Equation 5.

$$w^2 = 1 - (1 - w'^2) \times \frac{t'}{t}$$ [Equation 5]

Although the above Equation 5 indicates the ratio of lengths or the ratio of widths in the case in which the preparation hole 132 and the component receiving part 140 have a rectangular shape, it may also be applied to a ratio of diagonal lengths and to the case in which the preparation hole 132 and the component receiving part 130 have a circular shape.

That is, w may be a ratio of a diameter of the preparation hole 132 to a diameter of the step part 140, and w' may be a ratio of a diameter of the component receiving part 130 to the diameter of the step part 140.

The following Table 1 shows variously changed diameters of the preparation hole 132, variously changed diameters of the component receiving part 130, and variously changed thicknesses of the step part 140 in the case in which the step part 140 has a diameter of 20 mm and the base body 110 has a thickness t of 0.8 mm when the preparation hole 132 and the component receiving part 130 have a circular shape.

TABLE 1

| CASE | DIAMETER OF STEP PART | THICKNESS T OF BASE BODY | THICKNESS T' OF STEP PART | t'/t | DIAMETER OF COMPONENT RECEIVING PART | w' | w | DIAMETER OF PREPARATION HOLE |
|---|---|---|---|---|---|---|---|---|
| 1 | 20 | 0.8 | 0.6 | 0.750 | 5 | 0.250 | 0.545 | 10.9 |
| 2 | | | | | 10 | 0.500 | 0.661 | 13.2 |
| 3 | | | | | 15 | 0.750 | 0.820 | 16.4 |
| 4 | | | 0.5 | 0.625 | 5 | 0.250 | 0.643 | 12.9 |
| 5 | | | | | 10 | 0.500 | 0.729 | 14.6 |
| 6 | | | | | 15 | 0.750 | 0.852 | 17.0 |
| 7 | | | 0.4 | 0.500 | 5 | 0.250 | 0.729 | 14.6 |
| 8 | | | | | 10 | 0.500 | 0.791 | 15.8 |
| 9 | | | | | 15 | 0.750 | 0.884 | 17.7 |

The following Table 2 shows a pressing load required for forming the step part 140 in the base body 110 according to thicknesses t' of the step part 140 and diameters of the component receiving part 130.

TABLE 2

| DIAMETER OF COMPONENT RECEIVING PART (mm) | THICKNESS OF STEP PART (mm) | | |
|---|---|---|---|
| | 0.6 | 0.5 | 0.4 |
| 5 | 49.7 | 49.3 | 50.4 |
| 10 | 24.5 | 27.1 | 29.1 |
| 15 | 10.7 | 12.1 | 12.5 |

MAXIMUM LOAD (ton)

Figure 7:
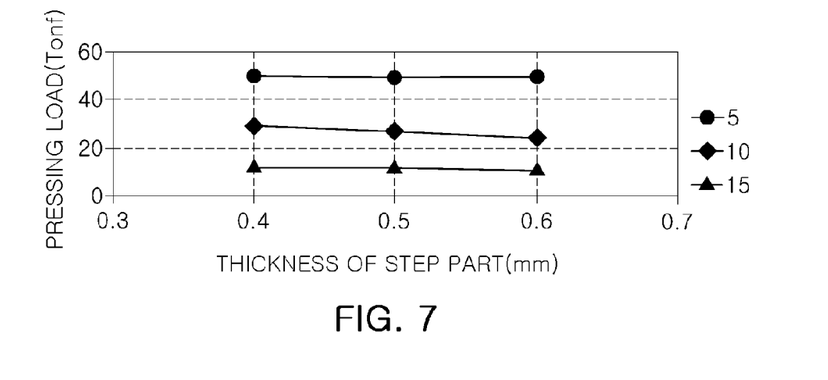
FIG. 7 is a graph showing a pressing load required in the case of allowing a diameter of the component receiving part to be constant and allowing a thickness of the step part to be changed.

FIG. 7 is a graph showing a pressing load required in the case of allowing a diameter of the component receiving part to be constant and allowing a thickness of the step part to be changed.

Referring to FIG. 7, it could be appreciated that there is no large difference in a magnitude of a pressing load required even in the case that the thickness t' of the step part 140 is variously changed with respect to each of the diameters of the component receiving part 130 when the diameters of the component receiving part 130 are 5 mm, 10 mm, and 15 mm, respectively.

Therefore, it could be appreciated that the magnitude of the pressing load is not significantly affected by the thickness t' of the step part 140.

Figure 8:
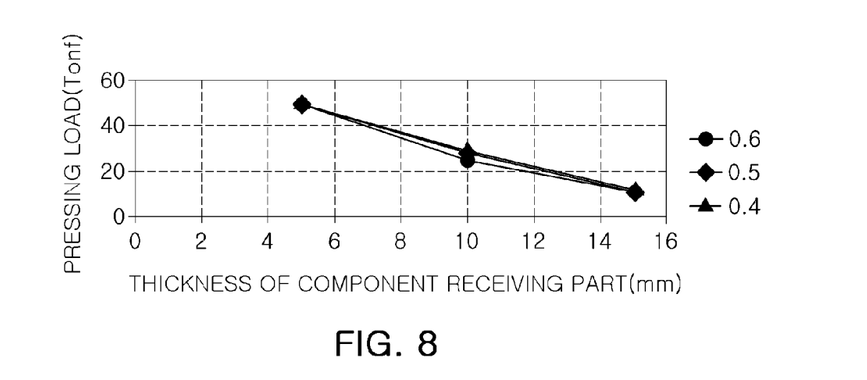
FIG. 8 is a graph showing a pressing load required in the case of allowing a thickness of the step part to be constant and allowing a diameter of the component receiving part to be changed.

FIG. 8 is a graph showing a pressing load required in the case of allowing a thickness of the step part to be constant and allowing a diameter of the component receiving part to be changed.

Referring to FIG. 8, it could be appreciated that there is a large difference in a magnitude of a pressing load required even in the case that the diameter of the component receiving part 130 is changed with respect to each of the thicknesses t' of the step part 140 when the thicknesses t' of the step part 140 are 0.4 mm, 0.5 mm, and 0.6 mm, respectively.

That is, the smaller the diameter of the component receiving part 130 is, the larger the required pressing load is, while the larger the diameter of the component receiving part 130 is, the smaller the required pressing load is.

Figure 9:
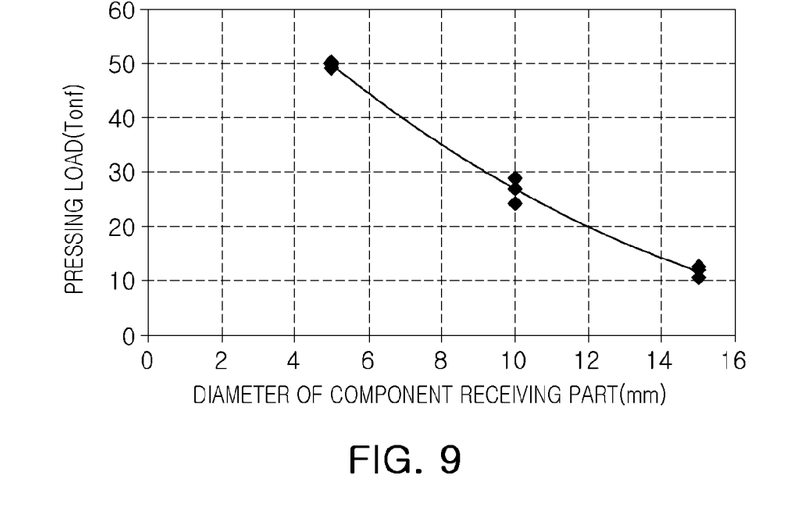
FIG. 9 is a graph showing a pressing load applied to the base body with respect to the diameter of the component receiving part.

Since the magnitude of the pressing load applied to the base body 110 is not significantly affected by the thickness t' of the step part 140, a relationship between the magnitude of the pressing load applied to the base body 110 and the diameter of the component receiving part 130 may be a quadratic polynomial relationship as shown in FIG. 9.

Therefore, an appropriate pressing load is applied to the base body 110, whereby the diameter of the component receiving part 130 may be formed to have a desired size.

In the case in which the hole is formed in the base body 110, rigidity may be deteriorated.

That is, in the case in which a load is applied to one end of the base body 100 including the hole formed therein, a sag amount of the base body 110 including the hole may be increased as compared with a base body that does not include a hole.

In addition, the sag amount of the base body may be affected by a size of the hole formed in the base body 110.

Since the component receiving part 130 according to the embodiment of the present invention is formed as the hole, when the component receiving part 130 is formed in the base body 110, the rigidity of the base body 110 may be deteriorated.

Figure 10:
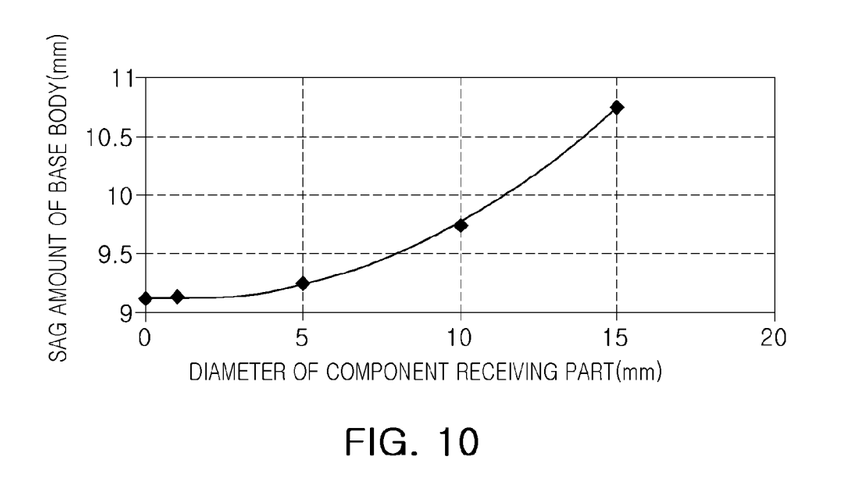
FIG. 10 is a graph showing a sag amount of the base body in the case in which a predetermined load is applied to the base body with respect to the diameter of the component receiving part.

FIG. 10 is a graph showing a sag amount of the base body in the case in which a predetermined load is applied to the base body with respect to the diameter of the component receiving part.

Referring to FIG. 10, it could be appreciated that the sag amount of the base body 110 for a bending load is changed according to the diameter of the component receiving part 130.

More specifically, a relationship between the diameter of the component receiving part 130 and the sag amount of the base body 110 may be a quadratic polynomial relationship, and the larger the diameter of the component receiving part 130 is, the larger the sag amount of the base body 110 is.

Therefore, it could be appreciated that the larger the diameter of the component receiving part 130 is, the lower the rigidity of the base body 110 is.

Therefore, it is required that the diameter of the component receiving part 130 may be appropriately determined so that there is no problem in the rigidity of the base body 110 even in the case that the component receiving part 130 is formed in the base body 110.

Figure 11:
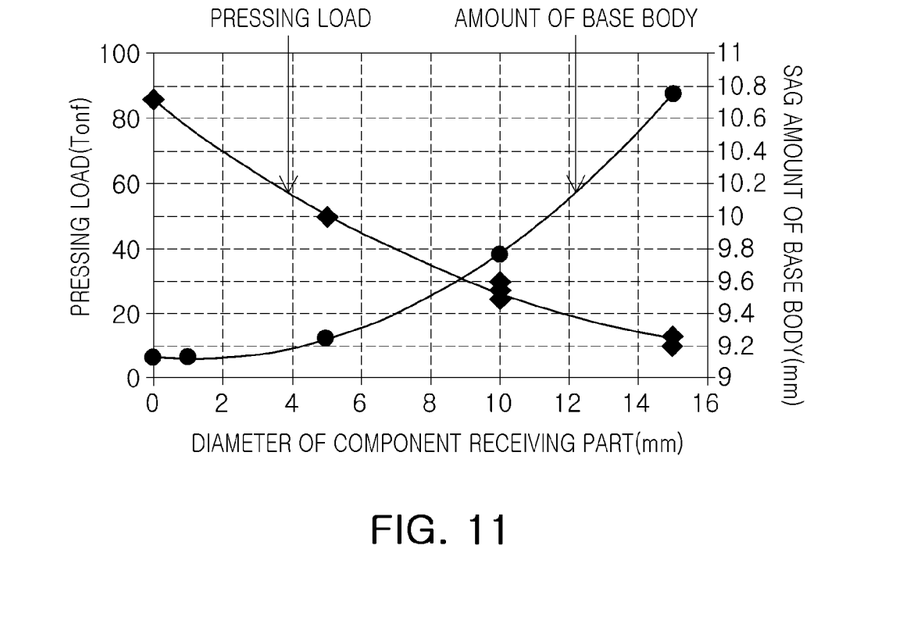
FIG. 11 is a graph showing both of the sag amount of the base body and the pressing load applied to the base body with respect to the diameter of the component receiving part.

As shown in FIG. 11, the pressing load required for forming the diameter of the component receiving part 130 to have a desired size and the sag amount of the base body 110 with respect to the diameter of the component receiving part 130 tend to be opposite to each other.

Referring to FIG. 11, a range capable of significantly decreasing the pressing load required for forming the step part 140 in the base body 110 while securing the rigidity of the base body 110 including the component receiving part 130 may be found out.

Therefore, a range of a ratio of the diameter of the component receiving part 130 to the diameter of the step part 140 may satisfy the following Equation 6.

$$0 < w' < 0.75 \quad \text{[Equation 6]},$$

The above Equation 6 means that the diameter of the component receiving part 130 may be in a range of 0 to 75% of the diameter of the step part 140.

Particularly, when the diameter of the component receiving part 130 is larger than 0% of the diameter of the step part 140 and is equal to or smaller than 50% of the diameter of the step part 140, an effect of maintaining the rigidity of the base body 110 may be excellent and the pressing load required for forming the step part 140 may also be decreased.

That is, the diameter of the component receiving part 130 may be in a range of 0 to 50% of the diameter of the step part 140.

Here, when the above Equation 6 is represented by a ratio (S') of an area of the component receiving part 130 to an area of the step part 140, it may be represented by the following Equation 7.

Referring to FIG. 6A, the area of the step part 140 may be represented by a×b, and referring to FIG. 6B, the area of the component receiving part 130 may be represented by x'×y'.

That is, the ratio (S') of the area of the component receiving part 130 to the area of the step part 140 may be represented by $$\frac{x' \times y'}{a \times b} = S'.$$

$$0 < S'^2 < 0.5625 \quad \text{[Equation 7]}$$

The above Equation 7 may be applied to the case in which the component receiving part 130 and the step part 140 have a rectangular shape, the case in which the component receiving part 130 and the step part 140 have a square shape, and the case in which the component receiving part 130 and the step part 140 have a circular shape.

Further, in order to satisfy the above Equation 6, a range of a ratio of the diameter of the preparation hole 132 to the diameter of the step part 140 may satisfy the following Equation 8.

$$0.4 < w < 0.9 \quad \text{[Equation 8]},$$

The above Equation 8 means that the diameter of the preparation hole 132 may be in a range of 40 to 90% of the diameter of the step part 140.

Here, when the above Equation 8 is represented by a ratio (S) of an area of the preparation hole 132 to an area of the step part 140, it may be represented by the following Equation 9.

Referring to FIG. 6A, the area of the step part 140 may be represented by a×b, and referring to FIG. 6A, the area of the preparation hole 132 may be represented by x×y.

That is, the ratio of the area of the preparation hole 132 to the area of the step part 140 may be represented by $$\frac{x \times y}{a \times b} = S.$$

$$0.16 < S^2 < 0.81 \quad \text{[Equation 9]},$$

The above Equation 9 may be applied to the case in which the component receiving part 130 and the step part 140 have a rectangular shape, the case in which the component receiving part 130 and the step part 140 have a square shape, the case in which the component receiving part 130 and the step part 140 have a polygonal shape, and the case in which the component receiving part 130 and the step part 140 have a circular shape.

According to the above-mentioned embodiments, the base plate 100 for a hard disk drive may be manufactured using the pressing or forging process, the introduction of the external foreign objects may be prevented, and the rigidity of the base body 110 may be maintained.

In addition, since the circuit component 410 mounted on the substrate 400 may be received in the component receiving part 130 formed in the base body 110, the overall height of the hard disk drive is decreased, whereby the hard disk drive may be miniaturized and thinned.

In addition, the base plate 100 is manufactured by the forging or pressing process to significantly decrease the process time and the energy consumption, whereby production capability may be significantly increased.

As set forth above, in a base plate, a method for manufacturing the same, and a hard disk drive including the same according to embodiments of the present invention, a component receiving part capable of receiving circuit components mounted on a substrate therein is provided to decrease the overall height of the hard disk drive, whereby the requirements for miniaturization and thinness may be satisfied.

In addition, even in the case that the base plate includes a space in which the circuit components mounted on the substrate are received, the rigidity of the base plate may be maintained.

Further, the introduction of foreign objects into the hard disk drive may be prevented.

Furthermore, the base plate is manufactured by a pressing or forging process to significantly decrease a process time and energy consumption, whereby production capability may be improved.

While the present invention has been shown and described in connection with the embodiments, it will be apparent to those skilled in the art that modifications and variations can be made without departing from the spirit and scope of the invention as defined by the appended claims.

What is claimed is:

1. A hard disk drive comprising:
   a base plate including a base body and a component receiving part penetrating through the base body;
   a substrate mounted on a lower portion of the base body; and
   a sealing member mounted on an upper portion of the base body,
   wherein a circuit component mounted on the substrate is received in the component receiving part so as not to protruded upwardly from the base body, a step part is formed in an upper surface of the base body, and the sealing member is seated on the step part to seal the component receiving part.

2. The hard disk drive of claim 1, wherein the base body is formed by plastically deforming a steel plate.

3. The hard disk drive of claim 1, wherein a thickness of the step part is less than that of the base body.

4. The hard disk drive of claim 1, wherein the hard disk drive satisfies an equation 0<S'$^2$<0.5625,
   where S'$^2$ indicates a ratio of an area of the component receiving part to an area of the step part.

5. The hard disk drive of claim 1, wherein a diameter of the component receiving part is larger than 0% of a diameter of the step part and is equal to or smaller than 50% of the diameter of the step part.

6. The hard disk drive of claim 1, further comprising:
   a spindle motor coupled to the base plate to rotate a disk;
   a magnetic head writing data to and reading data from the disk; and
   a head driver moving the magnetic head to a predetermined position on the disk.

7. A method for manufacturing a base plate for a hard disk drive, the method comprising:
   forming a preparation hole in a base body by penetrating through the base body in a predetermined position thereof;
   fixing the base body to a jig;
   pressing an outer edge of the preparation hole of the base body to form a step part in the base body and to decrease a size of the preparation hole; and forming a component receiving part in the base body by decreasing the size of the preparation hole, wherein the base plate satisfies an equation $w^2=1-(1-w'^2)(t'/t)$, where w indicates a ratio of a diameter of the preparation hole to a diameter of the step part, w' indicates a ratio of a diameter of the component receiving part to the diameter of the step part, t indicates a thickness of the base body, and t' indicates a thickness of the step part.

8. The method of claim 7, wherein the base plate satisfies an equation $0<S'^2<0.5625$, where $S'^2$ indicates a ratio of an area of the component receiving part to an area of the step part.

9. The method of claim 7, wherein the base plate satisfies an equation $0.16<S^2<0.81$, where $S^2$ indicates a ratio of an area of the preparation hole to an area of the step part.

10. The method of claim 7, wherein the base plate satisfies an equation $0<w'<0.75$, where w' indicates a ratio of the diameter of the component receiving part to the diameter of the step part.

11. The method of claim 7, wherein the base plate satisfies an equation $0.4<w<0.9$, where w indicates a ratio of the diameter of the preparation hole to the diameter of the step part.

* * * * *